US006982781B2

(12) United States Patent
Vetromile et al.

(10) Patent No.: US 6,982,781 B2
(45) Date of Patent: Jan. 3, 2006

(54) AUTOMATIC FUSER CONTROL

(75) Inventors: Joseph S. Vetromile, Rochester, NY (US); Richard C. Schenk, Webster, NY (US); Kenneth F. Blanchard, Big Pine Key, FL (US); Injae Choi, Webster, NY (US)

(73) Assignee: Xerox Corporation, Stamford, CT (US)

( * ) Notice: Subject to any disclaimer, the term of this patent is extended or adjusted under 35 U.S.C. 154(b) by 75 days.

(21) Appl. No.: 10/651,347

(22) Filed: Aug. 28, 2003

(65) Prior Publication Data

US 2005/0046814 A1 Mar. 3, 2005

(51) Int. Cl.
*G03B 27/52* (2006.01)
*G03G 15/20* (2006.01)

(52) U.S. Cl. .......................................... 355/40; 399/69

(58) Field of Classification Search .................. 355/40, 355/405; 399/68, 69, 67, 328, 327, 45; 219/216; 358/1.7

See application file for complete search history.

(56) References Cited

U.S. PATENT DOCUMENTS 4,017,065 A 4/1977 Poehlein
4,017,067 A 4/1977 Soures et al.
4,319,874 A 3/1982 Sawano
5,170,215 A 12/1992 Pfeuffer
5,543,894 A 8/1996 Carolan
5,689,788 A 11/1997 Moser
6,148,163 A 11/2000 Ito
6,393,230 B1 * 5/2002 Haneda et al. ................ 399/69
6,791,671 B1 * 9/2004 Hayashi et al. ............. 355/405
2003/0164958 A1 * 9/2003 Shima et al. ................ 358/1.7
2004/0033092 A1 * 2/2004 Aruga ........................ 399/329

FOREIGN PATENT DOCUMENTS

EP 00002303 A1 6/1979
EP 00414436 A2 2/1991
JP 61032876 2/1986

* cited by examiner

*Primary Examiner*—Peter B. Kim
(74) *Attorney, Agent, or Firm*—Maginot, Moore & Beck

(57) ABSTRACT

A print job processing method at least includes: providing processing attributes for particular print stock, including a predetermined fuser dwell time; establishing a print job, including the stock to be used for each page of the print job; for each page in the print job, selecting the appropriate subsystem containing the stock specified for the particular page; for each page in the print job, transferring image substance to each sheet to be printed, the placement of the image substance corresponding to an image to be duplicated on the page; matching the appropriate portion of the processing attributes to each subsystem; for each page, automatically fusing the image substance to the page according to the dwell time established by the processing attributes for the stock used for the page; and outputting processed pages.

20 Claims, 2 Drawing Sheets

AUTOMATIC FUSER CONTROL

FIELD OF THE INVENTION

The present invention generally relates to image reproduction devices or image forming apparatuses, such as high speed digital printers. More specifically, the present invention relates to improving the productivity of print jobs handled by such devices, apparatuses and printers when the stock for the print jobs is heterogeneous.

BACKGROUND OF RELATED ART

It is well known by those skilled in the art that many image forming apparatuses utilize fusing mechanisms ("fusers") to bond toner, ink or other image substances to pages receiving reproduced images. Fusers often function at an effective operating temperature needed for proper bonding of the image substance to the target page. If the fuser temperature is too low, the bond may be inadequate, possibly leading to smudging when the page is touched. With each fused page is a drop in the fuser temperature and the need for the fuser to recover to the appropriate temperature before the next page should be processed.

It is also well understood that different printing stock may require a longer fusing time ("dwell time") than others. Thus the appropriate dwell time for a particular stock is often directly proportional to metrics such as the stock thickness, and the amount and type of coating on the stock surface.

High speed digital copying machines for processing large print jobs are capable of copying books and other documents using mixed stock. For example, several pages of a pamphlet, book, etc. may be printed on "thin" stock making up the body of the book, while the book cover is typically printed on heavier stock requiring a longer dwell time. The typical prior art approach to printing a mixed stock print job is to print the entire job using the slower dwell time required by the heavier stock. For example, a print job using low weight paper or stock (often measured in gsm—"grams per square meter" or pounds per 500 sheets) might have a productivity of 66.6 prints per minute (PPM), while a print job using heavy stock might need to have a 50 percent reduction in the productivity at 33.3 PPM. So that all of the papers are properly fused, the entire print job is processed at 33.3 PPM.

As a further illustration, the prior art approach to print a seven-page print job such as a pamphlet with 5 regular or lightweight stock pages for the body and 2 heavyweight stock pages for the cover pages might reduce the productivity for the entire job to 33.3 PPM to accommodate the heavy cover stock, rather than a productivity (e.g., 66.6 PPM) closer to that available if just the lightweight stock were used.

One prior art approach is described by U.S. Pat. No. 6,160,974 issued to Takahiro Yoshikawa, et al. In the Yoshikawa patent an image forming apparatus such as a conventional copying machine allows a user to choose an "increased interval mode" for processing stock from a particular paper bin or paper tray when the bin or tray contains heavyweight or other paper requiring extra fusing. In other words, the interval between sheets to be processed is standard for all pages, unless the paper emanates from a paper bin which the user has designated for the Copies Per Minute Down Mode, in which case the interval is increased between pages to give the fusing unit extra time to return to the target operating temperature after a thick page has been processed.

In an alternate mode of the Yoshikawa patent approach, the sheet interval is increased during a print cycle when the temperature of the fusing unit drops below a threshold.

What is desirable is a reproduction device that automatically determines the fuser dwell time according to the stock required in the print job without the user having to specify particular paper trays or bins for increased dwell times. It is also desirable to carry out the above aspirations for stored print jobs that are expected to be processed at high rates using the likes of high speed digital printers.

SUMMARY

In view of the above-identified problems and limitations of the prior art, the present invention provides a print job processing method that at least includes: providing processing attributes for particular print stock, including a predetermined fuser dwell time; establishing a print job, including the stock to be used for each page of the print job; for each page in the print job, selecting the appropriate subsystem containing the stock specified for the particular page; for each page in the print job, transferring image substance to each sheet to be printed, the placement of the image substance corresponding to an image to be duplicated on the page; matching the appropriate portion of the processing attributes to each subsystem; for each page, automatically fusing the image substance to the page according to the dwell time established by the processing attributes for the stock used for the page; and outputting processed pages.

The present invention also provides a print job processing system that at least includes: a stock library adapted to provide processing attributes for particular print stock, including a predetermined fuser dwell time; a user input adapted to establish a print job, including the stock to be used for each page of the print job; a plurality of subsystems containing stock, adapted to be selected as required for each page in the print job, according to the stock specified for the particular page; an image substance transferor adapted to transfer, for each page in the print job, image substance to each sheet to be printed, the placement of the image substance corresponding to an image to be duplicated on the page; a stock library/subsystem matcher adapted to match the appropriate portion of the stock library to each subsystem; a fuser adapted to automatically fuse the image substance to the page according to the dwell time established by the stock library for the stock used for the page; and an output adapted to output pages processed by the fuser.

The present invention is not limited to image forming apparatuses using toner as the image substance for forming images on the pages. Apparatuses using certain types of ink as the image substance can also employ the present invention. Further, the present invention is suitable for both monochromatic and color reproduction techniques.

BRIEF DESCRIPTION OF THE DRAWINGS

Features of the present invention will become apparent to those skilled in the art from the following description with reference to the drawings, in which.

DETAILED DESCRIPTION

The term "printer" refers, for example, to reproduction devices in general, such as printers, facsimile machines, and copiers, and the term "print job" refers, for example, to information including the electronic item or items to be reproduced.

General System Description

Figure 1:
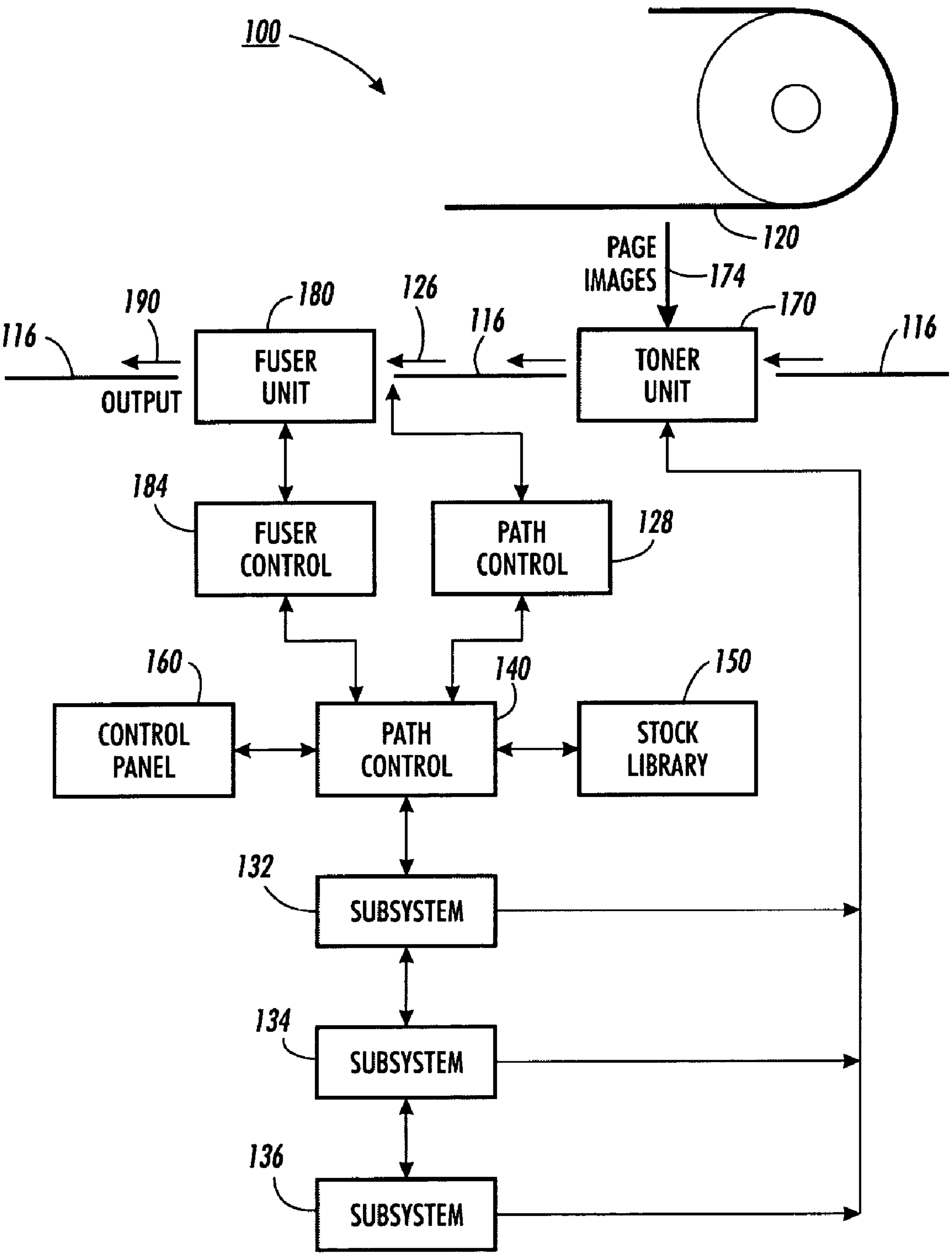
FIG. 1 is a general schematic diagram of the present-inventive system for optimizing printer productivity by automatically adjusting fuser dwell times for different printing stock.

The basic components of the system 100 incorporating the present-inventive automatic fuser dwell time adjustment feature are shown in FIG. 1. In embodiments, the system 100 is subsumed by a high speed digital printer, although it will be appreciated by those skilled in the art that this need not be so.

A functioning system for processing print jobs nominally includes components such as a photoreceptor belt 120 for registering and transporting images in a manner well-known in the art. Numerous sources exist that describe the general image reproduction process in more detail than here. One such source, for example, is U.S. Pat. No. 6,484,934 issued to David L. Salgado, and assigned to the same assignee of the present application for Letters Patent, which patent is hereby incorporated by reference.

Several subsystems 132, 134, and 136 contain stock for having print images transferred thereto. The subsystems can contain different types of print stock requiring different dwell times for effective fusing.

During an image transfer operation, a substrate page 116 from one of the subsystems 132, 134, 136 has an image substance such as toner deposited thereon by a toner unit 170 according to a page image 174 transferred from the photoreceptor belt 120 along a defined paper feed path 126. Those skilled in the art will appreciate that the image substance can be other than toner, including ink. The toner is fused to the substrate 116 in a fuser unit 180 and then output (190) for further handling such as collating, sorting, binding, etc.

The dwell time of the fuser 180 and the speed of the path are controlled by a fuser control 184 and a path control 128, respectively. The fuser control 184, path control 128, and indeed the printing operation as a whole are controlled by the printer control logic represented schematically as 140. The printer control 140 receives input from, inter alia, a user accessible control panel 160 and a stock library 150. The stock library 150 contains for all types of stock anticipated to be utilized by the system 100, information to be used by the printer control 140, such as the dwell time required for acceptable bonding and other processing attributes for the stock.

The amount of dwell time might be proportional to the weight of the stock used, the thickness of the stock used, or the amount of coating on the stock used. Alternatively in the case of coated paper, the fuser dwell time can be a standard value when the coating is below a threshold level, and can be a longer value when the coating exceeds the threshold level. The coating and thresholds correspond to types of coated stock that will use standard fuser dwell times and types of coated stock that that will need a longer fuser dwell time.

General Print Job Process Description

Figure 2:
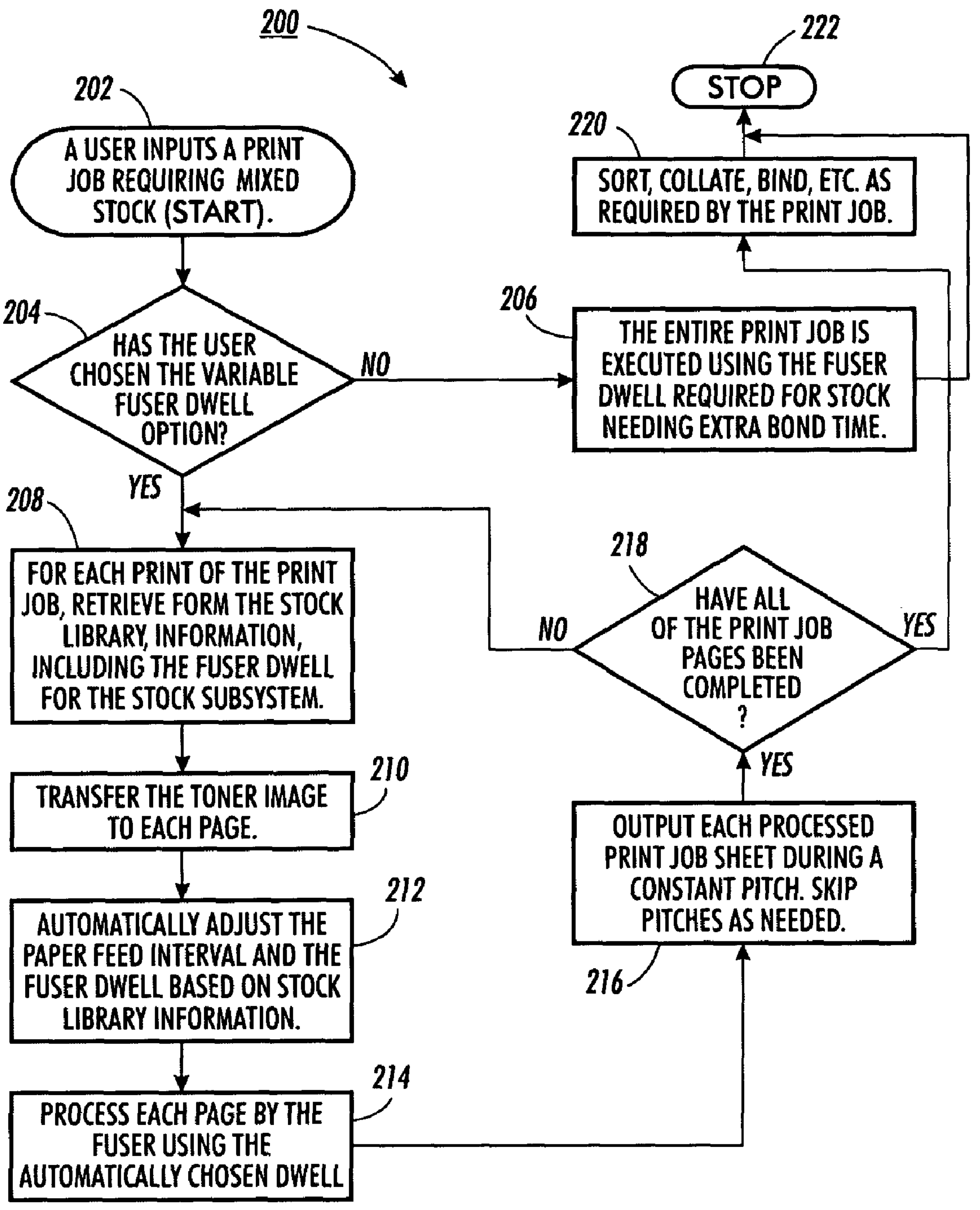
FIG. 2 is a flowchart detailing the steps employed by the present-inventive method for optimizing printer productivity by automatically adjusting fuser dwell times for different printing stock.

The present-inventive process in embodiments for executing print jobs requiring mixed stock and variable fuser dwell times is illustrated as an algorithm 200 in FIG. 2.

The process is initiated by a user requesting (via the control panel 160) that a print job be executed, the print job requiring more than one type of stock (Step 202). The print job may be already stored in memory, or stored while being produced on the fly.

The user can choose to execute the print job using a uniform dwell time or have the dwell time automatically adjusted for different stocks. If the user has not chosen the variable fuser dwell option, the print job is executed at a uniform dwell (the longer dwell needed for the stock requiring extra bond time) in Steps 204 and 206. The algorithm stops after executing Step 222. When the user selects the variable dwell option (Steps 204 and 208), the system 100 begins to process each page of the print job by selecting the appropriate subsystem for the required stock. The stock library 150 supplies the necessary dwell and other information for the subsystem to the printer control 140.

The image reproduction substance such as toner is applied to each page of the print job in Step 210. Under the control of the printer control 140, the path control 128 controls the path speed according to the type of stock currently being processed. The fuser control 184 also controls the dwell time of the fuser unit 180 to match that indicated by the stock library 150 (Steps 212 and 214). The dwell time can be controlled in a variety of ways, including varying the speed of rollers used to form the nip accepting each page.

The pages output by the fuser unit 180 are output during a constant paper pitch mode in the preferred embodiment, where "pitch" defines a sheet length (or width) plus the distance between the end of one sheet and the beginning of another sheet to be processed (Step 216). When increased dwell time has caused a delay in the output, the pitch is merely skipped. Thus, no page is output for that pitch, but the next page is output during the next available pitch once it is ready. Steps 208–216 are carried out for each page of the print job (Step 218).

The output pages are further processed according to print job or user instructions, including such steps as sorting the copies of the print job, collating the copies of the print job, or binding the copies of the print job (Step 220).

Variations and modifications of the present invention are possible, given the above description. However, all variations and modifications which are obvious to those skilled in the art to which the present invention pertains are considered to be within the scope of the protection granted by this Letters Patent.

What is claimed is:

1. A print job processing method comprising:

a) providing processing attributes for each type of print stock stored in a plurality of subsystems, each subsystem for containing sheets of print stock and said processing attributes for each print stock including a predetermined fuser dwell time;

b) establishing a print job, including a type of print stock to be used for each page of said print job;

c) for each page in said print job, selecting a subsystem containing the type of print stock specified for a particular page in an established print job;

d) for each page in an established print job, transferring image substance to a sheet of print stock provided from the subsystem selected for the page to be printed, the transferring of said image substance corresponding to an image to be duplicated on said sheet of print stock selected for the page to be printed;

e) supplying processing attributes that correspond to the type of print stock selected for a page in an established print job, the processing attributes being supplied from the processing attributes provided for all types of print stock contained in the plurality of subsystems f) for each page, automatically fusing said image substance to said sheet of print stock selected for the transfer of said image substance according to the dwell time of said processing attributes supplied for the print stock selected for each page; and g) outputting said sheets to which said image substance has been automatically fused.

2. The method in claim 1, further comprising:

defining a paper feed path; and adjusting a speed for the paper feed path in accordance with said dwell time of said processing attributes supplied for a sheet of print stock.

3. The method in claim 1, further comprising:

maintaining constant, defined paper pitches for a print job;

outputting pages of a print job only during a pitch; and during a print job, skipping pitches when print job pages require said skipping.

4. The method in claim 1, wherein said dwell time in said processing attributes provided for a type of print stock is proportional to a predetermined level of image substance bonding to a sheet of the type of print stock.

5. The method in claim 1, wherein said dwell time in said processing attributes provided for a type of print stock is proportional to a weight for a sheet of the type of print stock.

6. The method in claim 1, wherein said dwell time in said processing attributes provided for a type of print stock is proportional to a thickness for a sheet of the type of print stock.

7. The method in claim 1, further comprising:

establishing a threshold amount of coating material;

for each type of print stock, determining whether any coating on said type of print stock exceeds said threshold amount of said coating material; and increasing said dwell time in processing attributes for the type of print stock when said threshold amount is exceeded.

8. The method in claim 2, wherein said paper feed path is contiguous with a photoreceptor belt at least at one point.

9. The method in claim 1, wherein said image substance transfer comprises transferring toner to a sheet of print stock.

10. The method in claim 1, wherein said image substance transfer comprises transferring ink to a sheet of print stock.

11. A print job processing system comprising:

a stock library adapted to supply processing attributes for different types of print stock, including a predetermined fuser dwell time;

a user input adapted to establish a print job, including a print stock for each page of said print job;

a plurality of subsystems, each subsystem containing sheets of print stock at least one of the subsystems containing a type of print stock that is different from the print stock type in the other subsystems;

an image substance transferor adapted to transfer, for each page in said print job, image substance to each sheet to be printed, the placement of said image substance corresponding to an image to be duplicated on each said sheet;

a printer control for receiving processing attributes for each type of print stock selected for a print job from said stock library;

a fuser adapted to automatically fuse said image substance to each said sheet according to the dwell time in said processing attributes received from said stock library for the type of print stock selected for a page in said print job; and an output adapted to output pages processed by said fuser.

12. The system in claim 11, wherein said output is further adapted to maintain a constant, defined paper pitch for a print job, output pages of a print job only during a pitch, and during a print job, skip pitches when print job pages require said skip.

13. The system in claim 11, wherein said dwell time in said processing attributes provided for a type of print stock is proportional to a predetermined level of image substance bonding to a sheet of the type of print stock selected for a page.

14. The system in claim 11, wherein said dwell time in said processing attributes provided for a type of print stock is proportional to a weight for a sheet of the type of print stock selected for a page.

15. The system in claim 11, wherein said dwell time in said processing attributes provided for a type of print stock is proportional to a thickness for a sheet of the type of print stock selected for a page.

16. The system in claim 11, wherein said fuser is further adapted to increase said dwell time when a threshold amount of coating material on said stock is exceeded.

17. The system in claim 11, wherein said image substance comprises toner.

18. The system in claim 11, wherein said image substance comprises ink.

19. A print job processing system comprising:

a stock library adapted to supply processing attributes for different types of print stock, including a predetermined fuser dwell time;

a user input adapted to establish a print job, including a print stock for each page of said print job;

a plurality of subsystems, each subsystem containing sheets of print stock and adapted so that one subsystem from the plurality of subsystems may be selected to provide a sheet of print stock for a page in said print job, according to the print stock specified for the particular page through the user input;

an image substance transferor adapted to transfer, for each page in said print job, image substance to each sheet to be printed, the transfer of said image substance corresponding to an image to be duplicated on said sheet;

a printer control for receiving processing attributes for each type of print stock selected for a print job from said stock library a fuser adapted to automatically fuse said image substance to each said sheet according to the dwell time in said processing attributes received from said stock library for the type of print stock selected for a page in said print job;

an output adapted to output pages processed by said fuser; and a paper feed interval adjuster adapted to adjust the speed of a defined paper feed path in accordance with said dwell times in said processing attributes received from said stock library for different types of print stock for different pages in an established print job.

20. The system in claim 19, further comprising:

a photoreceptor belt is contiguous at least at one point with said paper feed path.

* * * * *